(12) United States Patent
Nakayashiki

(10) Patent No.: US 7,719,696 B1
(45) Date of Patent: May 18, 2010

(54) POSITION-DETECTING MECHANISM AND POSITION-DETECTING SENSOR

(75) Inventor: Hiroshi Nakayashiki, Matsuyama (JP)

(73) Assignees: Justin Co., Ltd., Ehime (JP); Wintec Co., Ltd., Ehime (JP)

( * ) Notice: Subject to any disclaimer, the term of this patent is extended or adjusted under 35 U.S.C. 154(b) by 549 days.

(21) Appl. No.: 10/593,856

(22) PCT Filed: Mar. 24, 2004

(86) PCT No.: PCT/JP2004/004116

§ 371 (c)(1),
(2), (4) Date: Jul. 30, 2007

(87) PCT Pub. No.: WO2005/090212

PCT Pub. Date: Sep. 29, 2005

(51) Int. Cl.
*G01B 11/14* (2006.01)

(52) U.S. Cl. .................. 356/614; 356/429; 250/559.36

(58) Field of Classification Search ......... 356/614–623, 356/429–431; 250/559.29, 559.36
See application file for complete search history.

(56) References Cited

U.S. PATENT DOCUMENTS

| | | | | |
|---|---|---|---|---|
| 4,110,627 | A * | 8/1978 | Isherwood | 250/559.36 |
| 5,870,204 | A * | 2/1999 | Chiu et al. | 356/430 |
| 7,075,099 | B2 * | 7/2006 | Buisker et al. | 250/559.36 |
| 2001/0001576 | A1 * | 5/2001 | Haque et al. | 356/429 |

FOREIGN PATENT DOCUMENTS

JP 2001-335206 4/2001

OTHER PUBLICATIONS

Japan patent application No. 2006-519095, Notification of Reasons for Rejection, dated Dec. 15, 2006 (and English translation).
Japanese Unexamined Utility Model Publication No. 1990-131609 (and English translation).

* cited by examiner

*Primary Examiner*—Hoa Q Pham
(74) *Attorney, Agent, or Firm*—Weaver Austin Villeneuve & Sampson LLP

(57) ABSTRACT

This invention provides a position-detecting mechanism and a position-detecting sensor, the calibration of the sensor easy, the deviation of a web from the reference line of the sensor easy to find. The position-detecting mechanism comprises (i) a light-emitting means 13 to emit a beam of visible light to a subject of measurement and (ii) a regulating means 14 to regulate the beam so that its cross section will be in a certain shape at the place of the subject of measurement and detects the position of the subject of measurement. Because the light-emitting means 13 emits a beam of visible light, the spot lit up by the beam on a subject of measurement is visible to the operator. Accordingly, the operator can judge the position of the subject of measurement by using his eyes alone without using a scale and easily, safely judge its position even while it is running on its production line.

9 Claims, 6 Drawing Sheets

(A)

(B)

(A)

(B)

(A)

(B)

F I G. 4
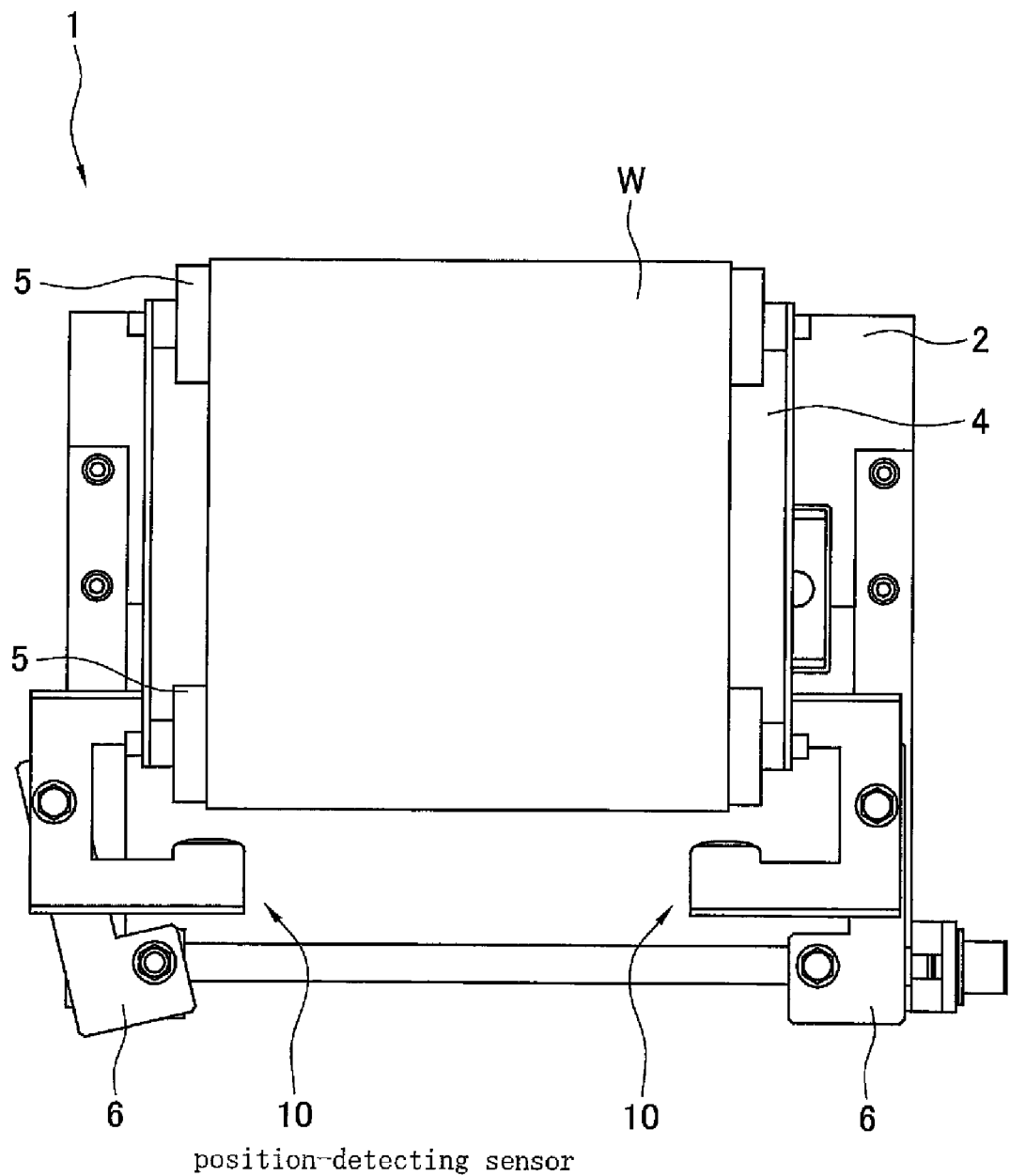
position-detecting sensor

POSITION-DETECTING MECHANISM AND POSITION-DETECTING SENSOR

This application was filed as PCT application No. PCT/JP2004/004116, filed Mar. 24, 2004.

TECHNICAL FIELD

This invention relates to a position-detecting mechanism and a position-detecting sensor. When a web of paper, nonwoven fabric, film, sheet steel, or the like runs on its production line, it may meander due to imbalance among rollers, malalignment of reels, or the like. Such meandering may reduce the production speed and cause defective webs to be produced. To rectify such meandering, web-guiding devices are known, which detect the positions of the right and left sides of a web and adjust the position of the web in accordance with the detected positional slippage of the right and left sides. Therefore, it is important for the web-guiding devices to detect the positions of the sides of webs accurately.

This invention relates to a position-detecting mechanism and a position-detecting sensor to detect the positions of the sides of webs.

BACKGROUND ART

The Japanese Unexamined Patent Publication Nos. 1995-10334 and 1999-282143 disclose position-detecting devices. Each device comprises a light source to cast light such as infrared rays on a web and a sensor to detect the light penetrating, or reflected by, the web. The position-detecting devices determine the movement of one side of a web based on the change of the quantity of light detected by the sensor. The reference value for the position-detecting devices to determine the positional slippage of a web is the quantity of light detected by the sensor when the web is positioned in its reference position. Accordingly, it is necessary for the sensor to be calibrated for a correct reference value before the production line is started. To put it concretely, while a web is positioned in its reference position, the reference line of the sensor is put exactly on one of the right and left sides of the web for a correct reference value. The reference line of the sensor may be the center line of the sensor.

The operator applies a ruler to the sensor to put its center exactly on one side of a web based on the reading on the ruler; accordingly, there may occur an error in applying the ruler to the sensor.

A plurality of said position-detecting devices are arranged along the right and left sides of a web running through a production line, and every position-detecting device's sensor has to be calibrated for a correct reference value; thus, the calibration work takes a good deal of labor and time.

Besides, if the centers of sensors come off the sides of the web due to vibrations, etc., the operator has to put them back into their places by applying a ruler while the production line is being operated; thus, the position-correcting work takes a great deal of labor and time.

DISCLOSURE OF INVENTION

Object of Invention

Accordingly, the object of the present invention is to provide a position-detecting mechanism and a position-detecting sensor, the calibration of the sensor easy, the deviation of a web from the reference line of the sensor easy to find.

Means of Solving the Problems

According to the first feature of the present invention, there is provided a position-detecting mechanism to detect a side of a subject of measurement. The position-detecting mechanism comprises (i) a light-emitting means to emit a beam of visible light to the subject of measurement and (ii) a regulating means to regulate the beam so that its cross section will be in a certain shape at the place of the subject of measurement. The cross-sectional area of the beam at the place of the subject of measurement is such that the change of the shape of the spot lit up by the beam on the subject of measurement is visible when the relative positions of the regulating means and the side of the subject of measurement have changed.

According to the second feature of the present invention, there is provided the position-detecting mechanism of the first feature. The regulating means of the position-detecting mechanism includes a marker-forming unit to show a marker indicating the position of the reference line of the position-detecting mechanism in the spot lit up by the beam on the subject of measurement.

According to the third feature of the present invention, there is provided the position-detecting mechanism of the first feature. The light-emitting means of the position-detecting mechanism is a light-emitting diode.

According to the fourth feature of the present invention, there is provided a position-detecting sensor, which comprises (i) a transmitting means to transmit a signal to a subject of measurement, (ii) a receiving means to receive the signal, and (iii) the position-detecting mechanism of the first, second, or third feature and detects the position of the subject of measurement based on the signal received by the receiving means.

According to the fifth feature of the present invention, there is provided the position-detecting sensor of the fourth feature. The transmitting means of the position-detecting sensor serves concurrently as the position-detecting mechanism.

Effects of the Invention

The advantages offered by the first feature of the present invention are as follows. Because the light-emitting means emits a beam of visible light, the spot lit up by the beam on the subject of measurement is visible to the operator. Accordingly, the operator can judge the position of the subject of measurement by the position of the spot on the subject of measurement. Besides, because the beam is regulated so that its cross section will be in a certain shape at the place of the subject of measurement and the cross-sectional area of the beam at the place of the subject of measurement is such that the change of the shape of the spot lit up by the beam on the subject of measurement is visible, the operator can judge the position of the subject of measurement just by checking the shape of the spot lit up by the beam on the subject of measurement. Thus, the operator can easily judge the position of a subject of measurement by using his eyes alone without using a scale. The operator can easily, safely judge the position of a subject of measurement even while it is running on its production line. If the position-detecting mechanism is incorporated into a position-detecting sensor, the operator can judge the deviation of a subject of measurement from the reference line of the position-detecting sensor by using his eyes alone. Therefore, the position-detecting sensor can be calibrated easily, accurately.

The advantage offered by the second feature of the present invention is as follows. With the position-detecting mechanism, the operator can judge the relative positions of the reference line of the position-detecting mechanism and a subject of measurement.

The advantage offered by the third feature of the present invention is as follows. Because the light-emitting means is a light-emitting diode, it consumes a small amount of electric power and its service life is long. Thus, its maintenance and running costs are low.

The advantage offered by the fourth feature of the present invention is as follows. Because the operator can judge the relative positions of the reference line of the position-detecting sensor and a subject of measurement, he can easily, accurately calibrate the position-detecting sensor.

The advantage offered by the fifth feature of the present invention is as follows. Because the transmitting means serves as the position-detecting mechanism, it is not necessary to provide the position-detecting mechanism in addition to the transmitting means. Thus, the structure of the position-detecting sensor can be simple and the position-detecting sensor itself can be compact.

BRIEF DESCRIPTION OF DRAWINGS

FIG. 4 is a schematic plan view of a web-guiding device provided with the position-detecting sensor of FIG. 1.

BEST MODE FOR CARRYING OUT THE INVENTION

A preferred embodiment of the position-detecting sensor of the present invention will be described below by referring to drawings.

The position-detecting sensor of the present invention is to detect the position of a subject of measurement and comprises a position-detecting mechanism capable of detecting the slippage of the subject of measurement from the reference line of the position-detecting sensor.

Subjects of measurement are webs or the like of paper, nonwoven fabric, film, sheet steel, etc. The position-detecting sensor of this embodiment is suitable especially for detecting the positions of the right and left sides of a web running on a production line. Described below is a web-guiding device which includes the position-detecting sensor of this embodiment to prevent a web running on a production line from meandering.

Before the position-detecting sensor is described, the web-guiding device will first be described.

Figure 5:
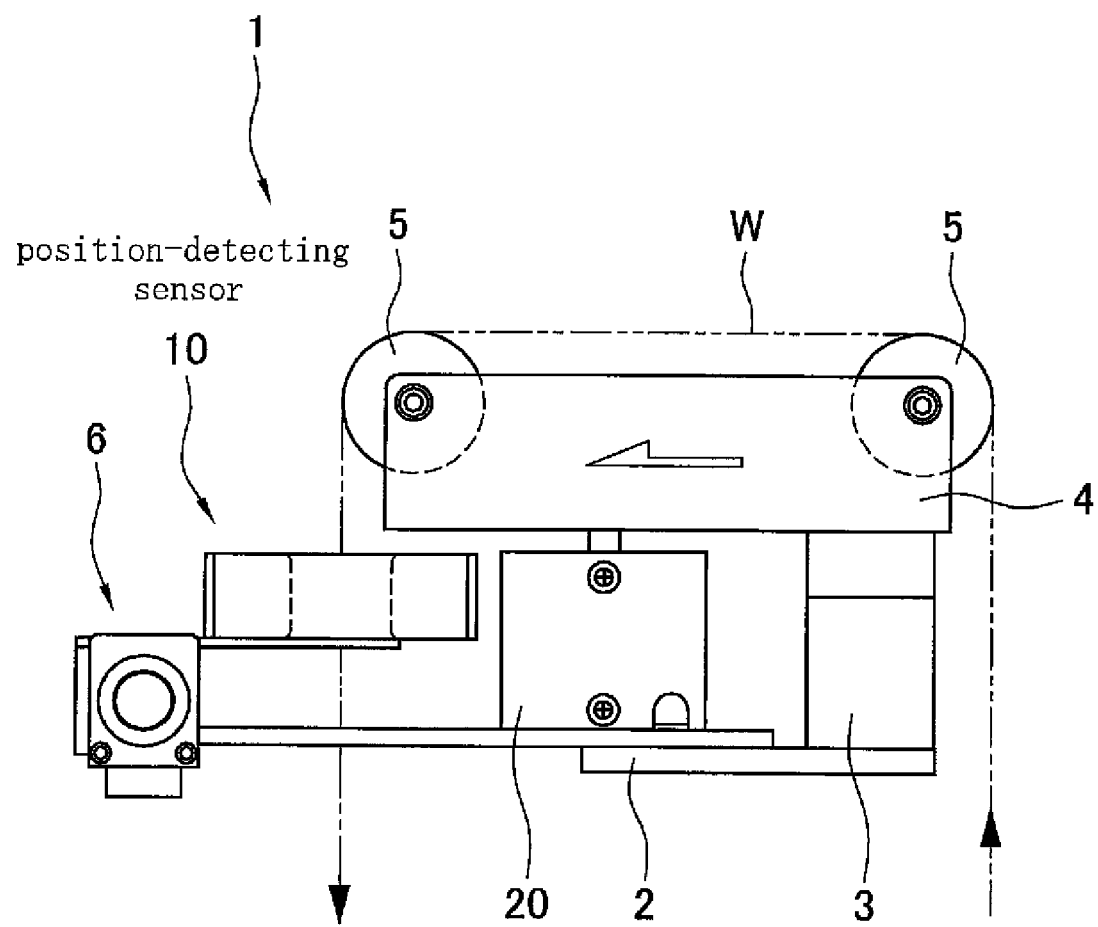
FIG. 5 is a schematic side view of the web-guiding device of FIG. 4.

FIG. 4 is a schematic plan view of the web-guiding device including the position-detecting sensor 10 of this embodiment. FIG. 5 is a side view of the web-guiding device of FIG. 4. Reference numerals 1 and 2 are the web-guiding device and its base, respectively. A shaft 3 is mounted on the base 2. Roller-frame members 4 and 4 are mounted on the shaft 3. The roller-frame members 4 and 4 support rollers 5 and 5 parallel to each other. A means 20 of swinging the roller-frame members 4 and 4 around the shaft 3 is provided on the base 2.

Reference sign "W" is a web running around the rollers 5 and 5. The web "W" is laid around the rollers 5 and 5 so that the center of the web "W" will run on the centers of the rollers 5 and 5 (hereinafter referred to as "reference position 'BL' of the web"). A position-detecting sensor 10 is disposed on each of the right and left sides of the web "W." Each position-detecting sensor 10 is supported by a sensor-supporting mechanism 6 on the base 2 so that the center axis of a beam of light "BM" to be described later will be in a plane including a normal line of the web "W" and remain in the plane if the position-detecting sensor 10 moves.

If the web "W" deviates from its reference position "BL," the position-detecting sensors 10 and 10 detect the deviation of the web "W" and a controller (not shown) actuates the swinging means 20. When the swinging means 20 swings the roller frames 4 and 4, the tilted rollers 5 and 5 drive the web "W" sideways so as to return the web "W" into its reference position "BL."

Next, the position-detecting sensor 10 will be described.

Figure 1:
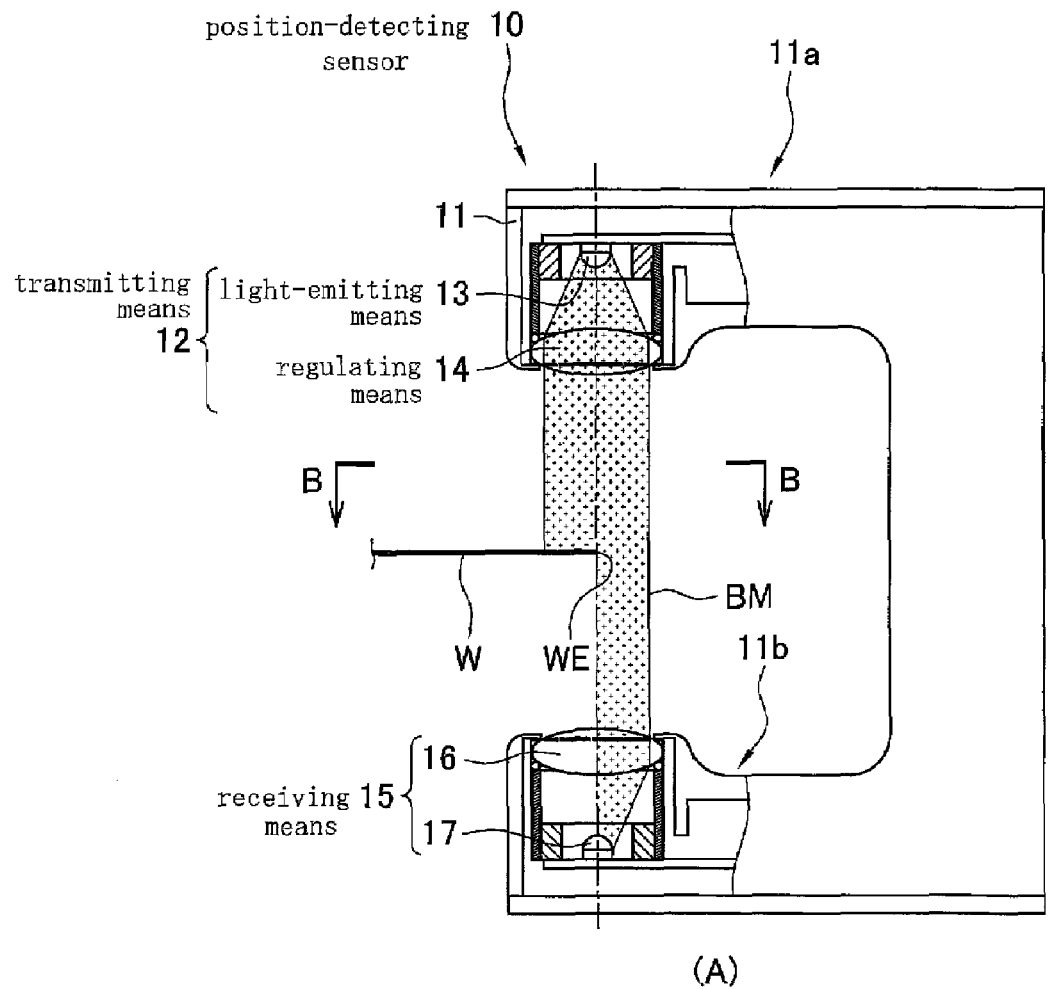
FIG. 1 is a schematic illustration of a typical position-detecting sensor of the present invention.
Figure 1:
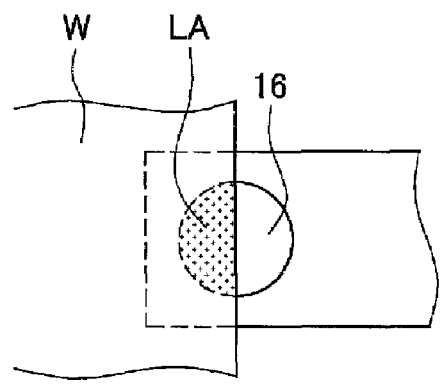

FIG. 1 is a schematic illustration of the position-detecting sensor 10. As shown in FIG. 1, the position-detecting sensor 10 has a frame 11 in the shape of "U" lying on its side. A web "W" runs between the two ends 11a and 11b of the frame 11.

The ends 11a and 11b of the frame 11 are provided with a transmitting means 12 and a receiving means 15, respectively.

The transmitting means 12 comprises a light-emitting means 13 and a regulating means 14. The light-emitting means 13 emits light toward a web "W." The regulating means 14 regulates the light into a beam whose cross section is in a certain shape at the place of the web "W." The reference sign "BM" in FIG. 1 is the regulated beam with the cross section of a certain shape.

The light-emitting means 13 may be a light-emitting diode which emits visible light. In this case, the light-emitting means 13 consumes a small amount of electric power and its service life is long. Thus, its maintenance and running costs are low.

The regulating means 14 may be a lens which collects the light from the light-emitting means 13 into a beam whose cross section is circular at the place of the web "W." Other devices, including a mere transparent glass plate, may be adopted as the regulating means 14 so long as they are capable of regulating the light from the light-emitting means 13 into a beam whose cross section is in a certain shape at the place of the web "W." It is desirable, however, for the regulating means 14 to be a lens as described above because the regulating means 14 raises the intensity of the regulated beam "BM."

The cross section of the regulated beam "BM" at the place of the web "W" may be in any shapes including a circular shape, and nothing in particular restricts the choice of the cross-sectional area of the regulated beam "BM." It is desirable, however, that the shape of the spot (hereinafter "visible-light spot 'LA'") on the web "W" lit up by the regulated beam "BM" reveals wholly the shape of the cross section of the regulated beam "BM" when the regulated beam "BM" is wholly applied onto the web "W" and that the shape of the visible-light spot "LA" reveals partially the shape of the cross section of the regulated beam "BM" when the regulated beam "BM" is partially applied onto the web "W."

If the cross section of the regulated beam "BM" is circular as shown in FIG. 1 (B), it is desirable that the cross-sectional area of the regulated beam "BM" allows the operator to see that the visible-light spot "LA" is semicircular when the side "WE" of the web "W" is at the center of the regulated beam "BM" and that the cross-sectional area of the regulated beam "BM" allows the operator to see that the visible-light spot "LA" is larger or smaller than the half of the cross-sectional area of the regulated beam "BM" when the side "WE" of the web "W" is off the center of the regulated beam "BM."

On the other hand, the receiving means 15 comprises a light-receiving element 16, such as a lens or a transparent plate, which allows the regulated beam "BM" to pass through and a light detector 17, such as a photoelectric tube, which detects the quantity of light of the regulated beam "BM" coming through the light-receiving element 16.

If the position-detecting sensor 10 is so disposed that part of the regulated beam "BM" will be blocked off by the web "W" when the web "W" is put in its reference position "BL," the quantity of light received by the receiving means 15 changes when the web "W" deviates from its reference position "BL." Accordingly, the position-detecting sensor 10 can determine which direction the web "W" has moved in based on the increase or decrease of the quantity of light received and how far the web "W" has deviated based on the degree of change of the quantity of light received.

The magnitude of deviation of the web "W" is determined based on increases and decreases in the quantity of light received by the receiving means 15. The reference light quantity is the light quantity when the web "W" is in its reference position "BL." Accordingly, the position-detecting sensors 10 have to be calibrated for the reference light quantity before the production line is started.

Before the calibration of each position-detecting sensor 10 for the reference light quantity, the reference line of said position-detecting sensor 10 has to be put exactly on the side "WE" of the web "W." This adjustment is important because if the reference line of said position-detecting sensor 10 is off the side "WE" of the web "W," correct reference light quantity cannot be achieved and, hence, the slippage of the web "W" from its reference position cannot be determined correctly.

The calibration of the position-detecting sensor 10 for the reference light quantity will be described below.

Here the center line "CL" running through the centers of the transmitting means 12 and the receiving means 15 is treated as the reference line of the position-detecting sensor 10, but other lines may be treated as the reference line.

When the transmitting means 12 emits a regulated beam "BM" with a circular cross section to the web "W," a visible-light spot "LA" lit up by the regulated beam "BM" appears on the web "W." Accordingly, the operator can see the spot "LA." If the center line "CL" of the position-detecting sensor 10 is exactly on the side "WE" of the web "W," the visible-light spot "LA" is semicircular, indicating to the operator that the reference line of the position-detecting sensor 10 is exactly on the side "WE" of the web "W."

If the visible-light spot "LA" is not semicircular, the sensor-supporting mechanism 6 moves the position-detecting sensor 10 so that the visible-light spot "LA" will become semicircular. Thus, the reference line of the position-detecting sensor 10 is put exactly on the side "WE" of the web "W."

Because the operator can see the visible-light spot "LA," he can judge whether or not the reference line of the position-detecting sensor 10 is put exactly on the side "WE" of the web "W" just by checking the shape of the visible-light spot "LA." Thus, the calibration of the position-detecting sensor 10 for the reference light quantity can be made easily and accurately.

Because the operator can find the relative positions of the position-detecting sensor 10 and the side "WE" of the web "W" just by checking the shape of the visible-light spot "LA," he can easily, safely judge whether or not the reference line of the position-detecting sensor 10 is put exactly on the side "WE" of the web "W" if the web "W" is running.

As the transmitting means 12 is equivalent to, and serves as, the position-detecting mechanism mentioned in the claims, it is not necessary to provide the position-detecting mechanism in addition to the transmitting means 12. Thus, the structure of the position-detecting sensor 10 can be simple and the position-detecting sensor 10 itself can be compact.

If the position-detecting sensor 10 is a sensor, such as an acoustic sensor or an air sensor, which detects the position of a web "W" by making use of other signals than beams of visible light and the position-detecting sensor 10 is provided with a position-detecting mechanism whose construction is similar to the transmitting means 12, the operator can easily, safely judge whether or not the reference line of the position-detecting sensor 10 is put exactly on the side "WE" of the web "W" and, if there is a slippage, easily put the reference line of the position-detecting sensor 10 exactly on the side "WE" of the web "W."

Figure 2:
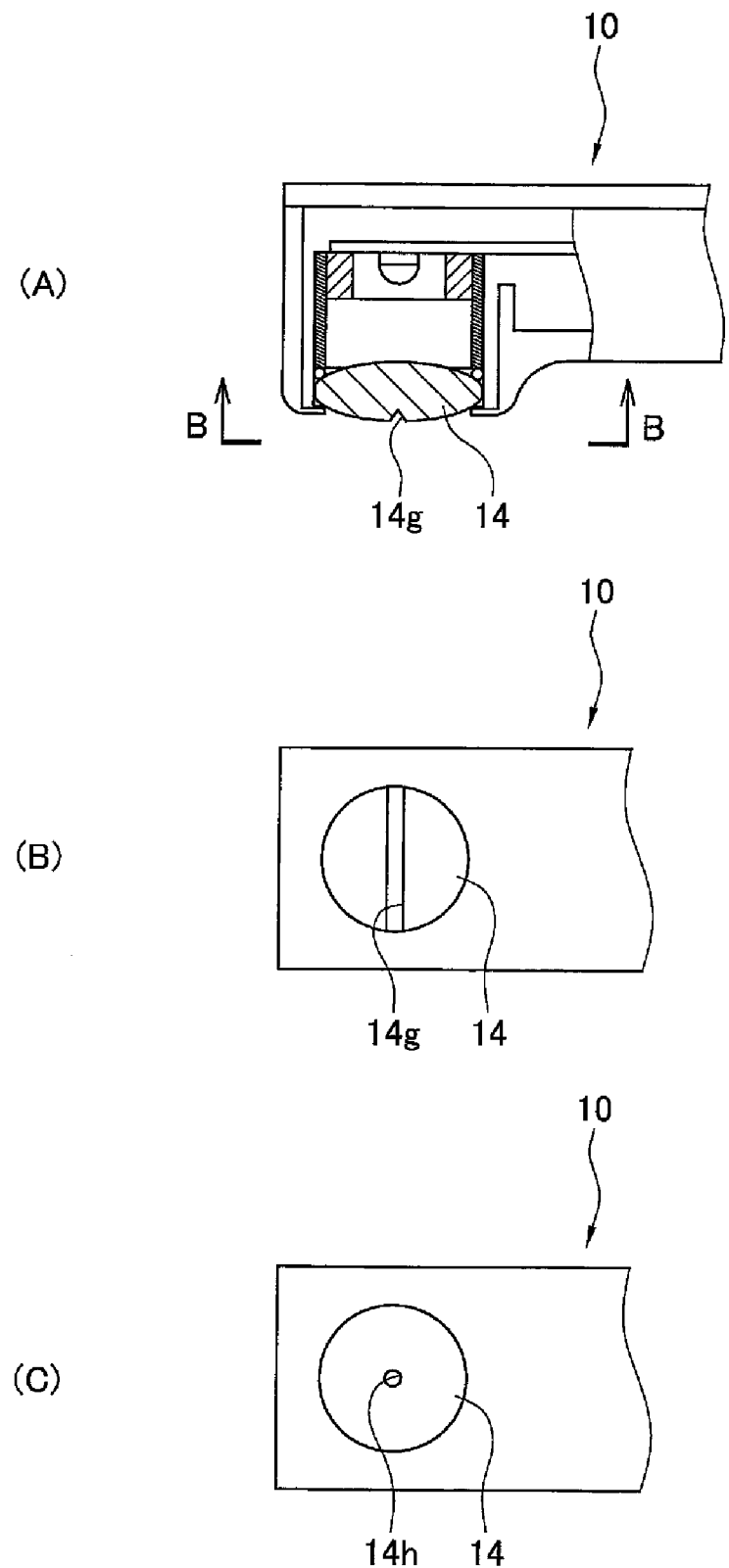
FIG. 2 is a schematic illustration of embodiments of the regulating means of the transmitting means of the position-detecting sensor of FIG. 1.
Figure 3:
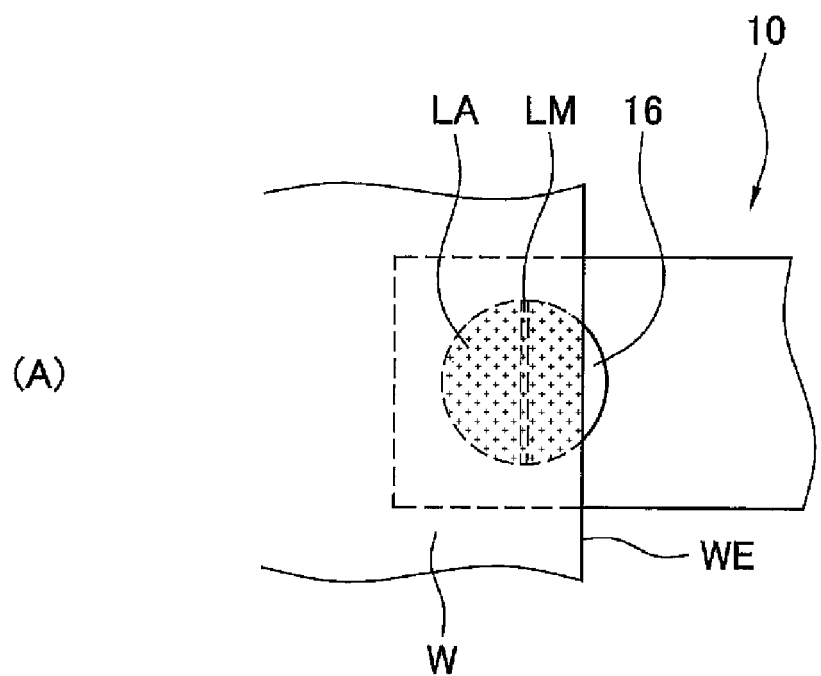
FIG. 3 is a schematic illustration of a visible-light spot lit up by a regulated beam emitted by the transmitting means of the position-detecting sensor of FIG. 1.
Figure 3:
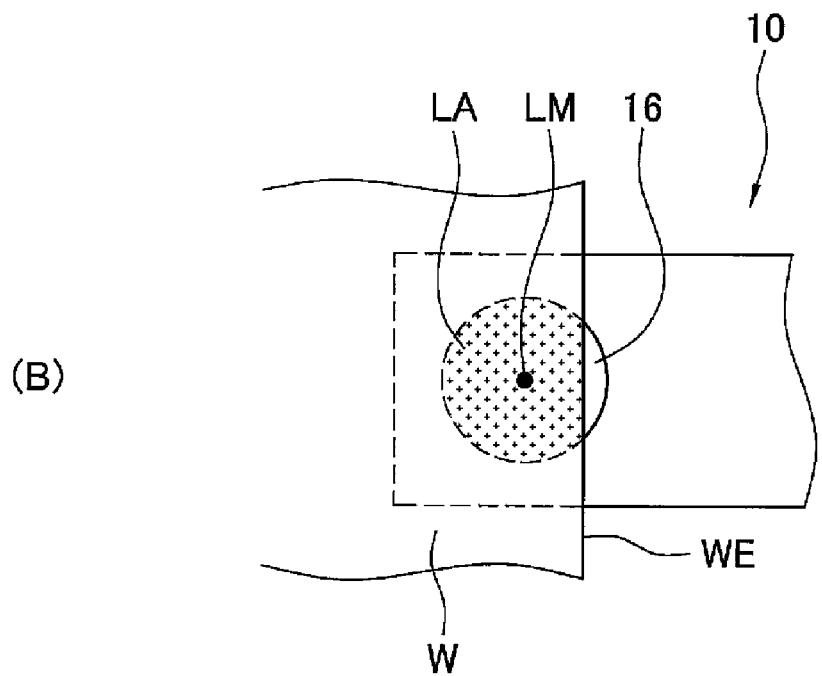

If the regulating means 14 has a groove 14g which is made in its surface and runs through the center of its surface, in the running direction of the web "W" or a hollow, or depression, 14h which is made at the center of its surface as shown in FIG. 2, the part (hereinafter "reference-line marker 'LW'") of the visible-light spot "LA" corresponding to the groove 14g or hollow 14h has a brightness different from the brightness of the other part of the visible-light spot "LA." In this case, the operator can easily, accurately find the relative positions of the position-detecting sensor 10 and the side "WE" of the web "W" by comparing the position of the reference-line marker "LM" and the position of the side "WE" of the web "W." Thus, the operator can easily put the reference line of the position-detecting sensor 10 exactly on the side "WE" of the web "W" just by putting the reference-line marker "LM" exactly on the side "WE" of the web "W" (see FIG. 3).

The groove 14g and the hollow 14h are the marker-forming unit mentioned in the claims.

Figure 6:
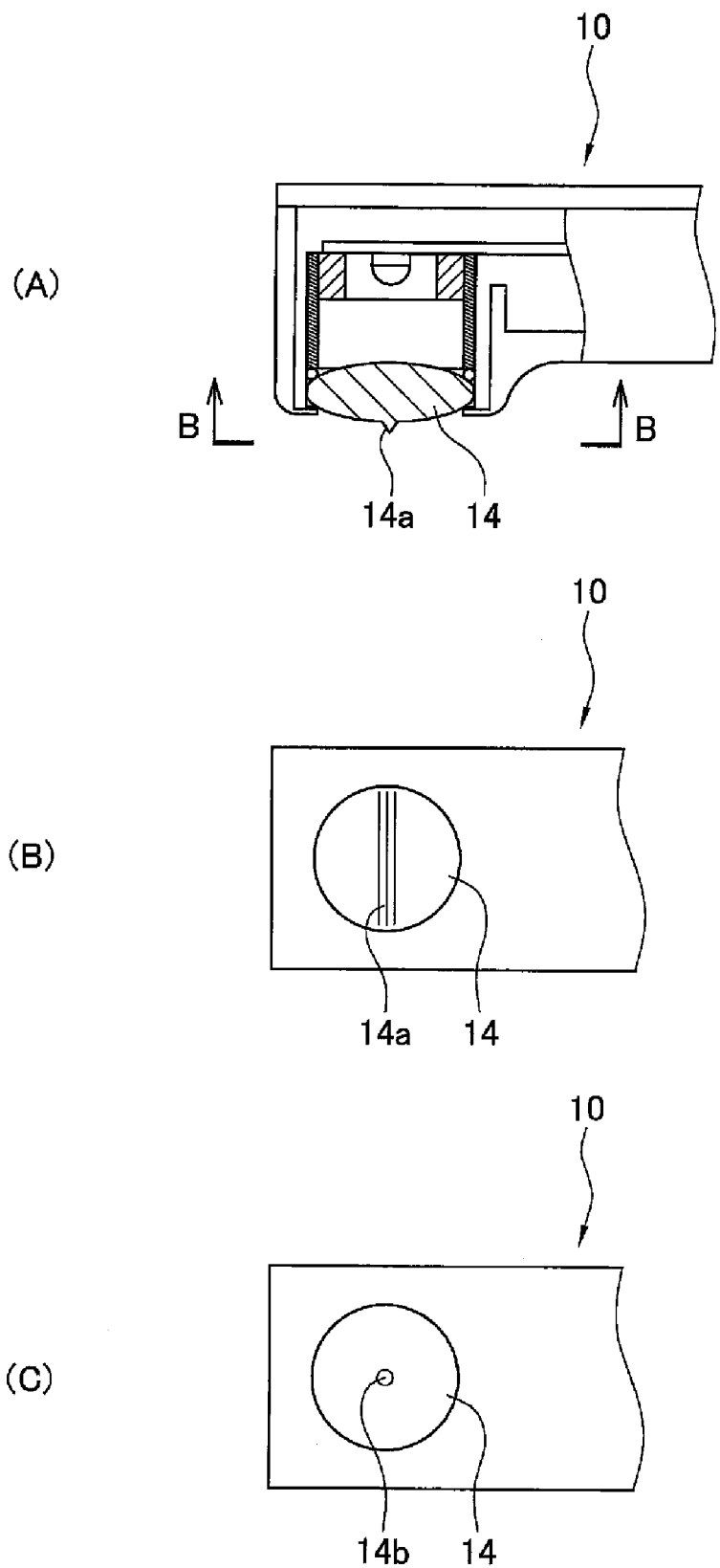
FIG. 6 is a schematic illustration of other embodiments of the regulating means of the transmitting means of the position-detecting sensor of FIG. 1.

As shown in FIG. 6, the marker-forming unit may be a linear protrusion which is made on the surface of the regulating means 14 and extends through the center of the surface of the regulating means 14, in the running direction of the web "W" as shown in FIG. 6 (B) or a point of protrusion which is made at the center of the surface of the regulating means 14 as shown in FIG. 6 (C). In this case, too, the part of the visible-light spot "LA" corresponding to the linear protrusion or the point of protrusion has a brightness different from the brightness of the other part of the visible-light spot "LA," forming a reference-line marker "LM."

The marker-forming unit may be made in any other ways so long as it can form a visible marker in the visible-light spot "LA." For example, opaque paint may be applied to the surface of the regulating means 14 or an opaque seal may be pasted onto the surface of the regulating means 14.

If stripes appear in the visible-light spot "LA" because of the interference by the regulated beam "BM" irregularly reflected by the frame 11 or the like, the operator can judge whether or not the reference line of the position-detecting sensor 10 is put exactly on the side "WE" of the web "W" just by comparing the stripes and the side "WE" of the web "W." Thus, the marker-forming unit can be dispensed with.

INDUSTRIAL APPLICABILITY

The position-detecting mechanism and the position-detecting sensor of the present invention are suitable for detecting the positions of the sides of webs on web production lines.

The invention claimed is:

1. A position-detecting mechanism to detect a side of a subject of measurement, comprising:
   a light-emitting means to emit a beam of visible light to the subject of measurement; and
   a regulating means to regulate the beam so that its cross section will be in a certain shape at the place of the subject of measurement, the cross sectional area of the beam at the place of the subject of measurement being such that the change of the shape of the spot lit up by the beam on the subject of measurement is visible when the relative positions of the regulating means and the side of the subject of measurement have changed.

2. The position-detecting mechanism according to claim 1, wherein the regulating means includes a marker-forming unit to show a marker indicating the position of the reference line of the position-detecting mechanism in the spot lit up by the beam on the subject of measurement.

3. The position-detecting mechanism according to claim 1, wherein the light-emitting means is a light-emitting diode.

4. A position-detecting sensor which comprises a transmitting means to transmit a signal to a subject of measurement, a receiving means to receive the signal, and the position-detecting mechanism of claim 1, and detects the position of the subject of measurement based on the signal received by the receiving means.

5. The position-detecting sensor according to claim 4, wherein the transmitting means serves concurrently as the position-detecting mechanism.

6. The position-detecting sensor according to claim 4, wherein the regulating means includes a marker-forming unit to show a marker indicating the position of the reference line of the position-detecting mechanism in the spot lit up by the beam on the subject of measurement.

7. The position-detecting sensor according to claim 6, wherein the transmitting means serves concurrently as the position-detecting mechanism.

8. The position-detecting sensor according to claim 4, wherein the light-emitting means is a light-emitting diode.

9. The position-detecting sensor according to claim 8, wherein the transmitting means serves concurrently as the position-detecting mechanism.

\* \* \* \* \*